United States Patent [19]
Kish et al.

[11] 3,737,603
[45] June 5, 1973

[54] PRESSURE RESPONSIVE PISTON ACUATED SWITCH AND VALVE MEANS

[75] Inventors: George R. Kish, Owosso; Kenneth B. Swanson, Bannister, both of Mich.

[73] Assignee: Midland-Ross Corporation, Cleveland, Ohio

[22] Filed: July 19, 1971

[21] Appl. No.: 164,134

Related U.S. Application Data

[62] Division of Ser. No. 47,718, June 19, 1970, Pat. No. 3,674,954.

[52] U.S. Cl. ................200/82 D, 251/63.4, 303/6 C
[51] Int. Cl. .........................H01b 35/38, B60t 17/22
[58] Field of Search .......................200/82 D, 153 V; 303/6 C, 84 A; 251/63.4

[56] References Cited
UNITED STATES PATENTS

| | | | |
|---|---|---|---|
| 3,614,169 | 10/1971 | Bueler | 200/82 D X |
| 3,480,333 | 11/1969 | Stelzer | 200/82 D X |
| 3,394,401 | 7/1968 | Roberts | 200/82 D |
| 3,637,963 | 1/1972 | Wellman | 200/82 D |

FOREIGN PATENTS OR APPLICATIONS
813,553  5/1959  Great Britain......................200/82 D

*Primary Examiner*—Robert K. Schaefer
*Assistant Examiner*—Robert A. Vanderhye
*Attorney*—McKinnon & Groh

[57] ABSTRACT

A pressure responsive mechanism for use in dual hydraulic brake systems of automative vehicles wherein the front and rear brakes of the vehicle are provided with independent hydraulic brake systems actuated by a dual master cylinder, the pressure responsive mechanism being interposed between the dual master cylinder and the front and rear brake actuators and incorporating means actuable when a predetermined pressure differential occurs between the front and rear brake systems to effect a signal and being automatically reset when the pressure differential falls below a predetermined value. The pressure responsive mechanism includes switch actuator means and a pair of pressure responsive members disposed on opposite sides of and normally spaced from said actuator means, but movable into contact with said actuator means upon normal brake operation, and moving said actuator means if brake failure should occur.

10 Claims, 6 Drawing Figures

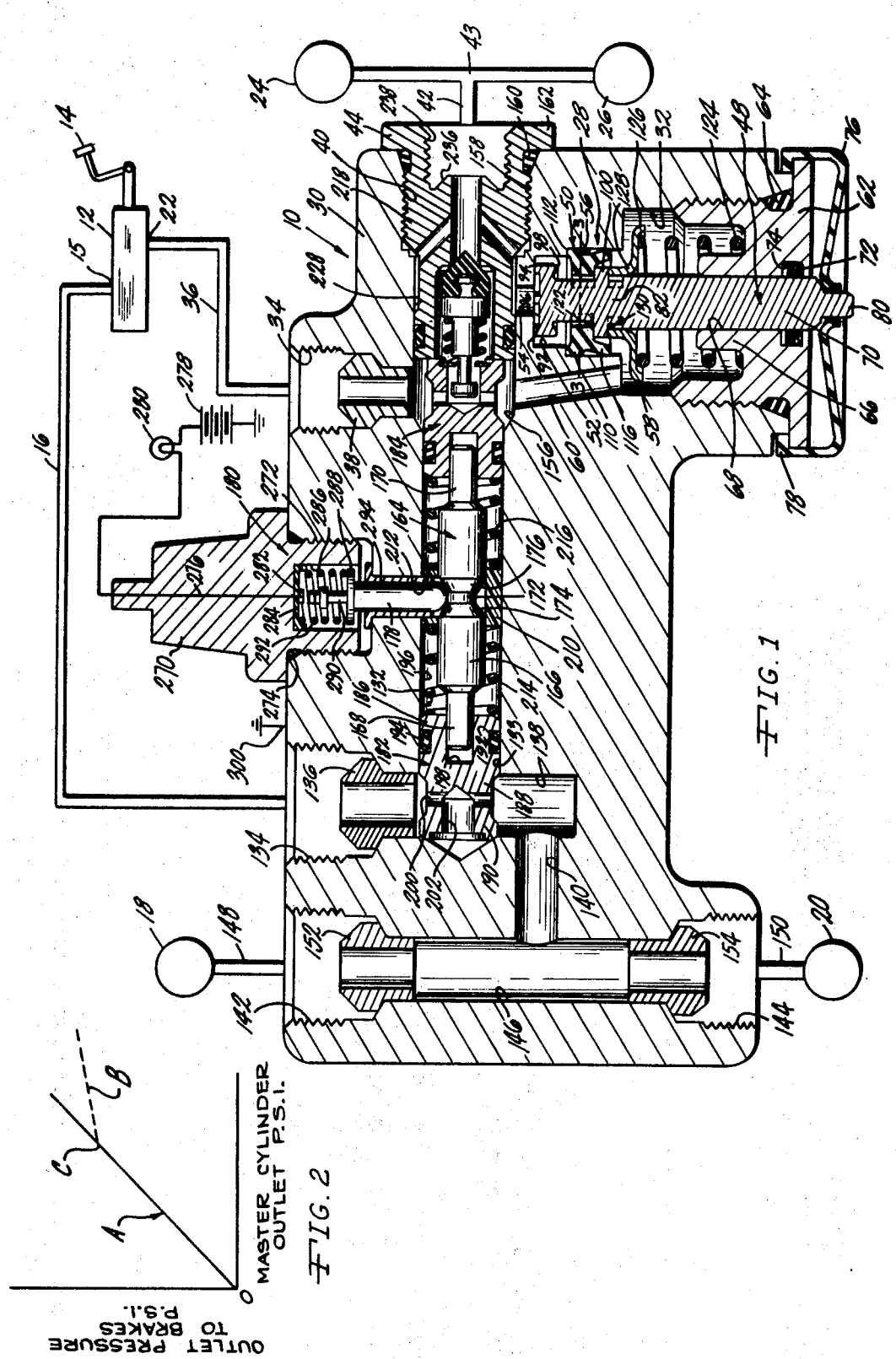

PRESSURE RESPONSIVE PISTON ACUATED SWITCH AND VALVE MEANS

CROSS REFERENCE TO RELATED APPLICATIONS

This application is a division of the applicants' copending application Ser. No. 47,718, filed June 19, 1970.

SUMMARY OF THE INVENTION

This invention relates to pressure responsive mechanisms and, more particularly, to an improved pressure responsive mechanism particularly adapted for use in dual or split automotive vehicle hydraulic brake systems wherein one set of brake actuators, for example, the brakeactuators at the front wheels of the vehicle are actuated by a first hydraulic system while another set of brake actuators, such as the brake actuators at the rear wheels, are actuated by a second hydraulic system which is hydraulically independent of the first hydraulic system. The present invention is also applicable to other types of dual hydraulic brake systems such as dual brake systems wherein the wheels of the vehicle are each provided with a plurality of brake actuators, the actuators at each wheel being actuated by independent hydraulic systems. It should also be understood that the present invention is applicable to other hydraulic or pneumatic dual or split systems.

As is well known in the art, in order to increase the safety factor in automotive vehicle hydraulic brake systems, many modern automotive vehicles such as automobiles and trucks are equipped with dual hydraulic brake systems, conventionally known as split systems, wherein hydraulic brake fluid is delivered from one pressurizable cylinder of a dual master cylinder through a first system of brake lines to the brake actuators or wheel cylinders at the front wheels of the vehicle and hydraulic brake fluid is also delivered from a second pressurizable cylinder of the dual master cylinder through a second system of brake lines to the brake actuators or wheel cylinders at the rear wheels of the vehicle, the two separate cylinders of the dual master cylinder being simultaneously pressurized upon the application of force by the vehicle operator to a brake pedal effective to actuate the dual master cylinder. With such a construction, in the event of loss of braking action at one set of wheels due to loss of brake fluid or pressure in one half of the split system, actuation of the dual cylinder is still effective to apply the brakes at the other set of wheels by pressurization of the other half of the split system.

As also known in the art, during deceleration of an automotive vehicle, a portion of the weight borne by the rear wheels of the vehicle is transferred to the front wheels of the vehicle and as a result of such weight transfer, the maximum braking effort which the rear wheels are capable of applying is reduced and the maximum braking effort which the front wheels are capable of applying is increased. Consequently, it is desirable to deliver higher brake fluid pressures to the front brake actuators of the vehicle than to the rear brake actuators of the vehicle during high rates of deceleration such as are encountered during panic stops so that the skidding tendencies of the rear wheels are reduced, control of the vehicle may be maintained and the stopping distance decreased. Consequently, various pressure proportioning valves have been utilized in hydraulic brake systems of automotive vehicles, the proportioning valves being adapted to reduce the relative pressurization of the rear brake actuators of the vehicle with respect to the pressurization of the front brake actuators in the higher ranges of applied brake pressure.

It is difficult for the operator of an automotive vehicle equipped with a dual hydraulic brake system of the indicated character to recognize merely by the feel of the brake pedal if one or the other of the hydraulic systems has failed or is not operating properly. Moreover, if the vehicle is equipped with a proportioning valve effective to establish a fluid pressure differential between the front and rear brake actuators in the higher ranges of pressure applied by the master cylinder, and a failure occurs resulting in loss of pressurization of the front system while pressurization of the rear brake actuators has been reduced relative to the front brake actuators, it is desirable to immediately apply the maximum master cylinder pressure to the rear brake actuators so that the maximum available braking action of the vehicle may be obtained under such conditions.

Heretofore, various pressure responsive switches have been utilized in dual hydraulic brake systems of automotive vehicles, the pressure responsive switches being adapted to complete an electrical circuit effective to energize a signaling device to apprise the vehicle operator that a failure has occurred in one or the other of the dual hydraulic brake systems. However, prior pressure responsive switches of the indicated character have been subject to the defect that they must be replaced or removed from the hycraulic system for resetting purposes after they have been actuated, and the labor and expense incident to replacement or manual resetting of such prior devices by an automobile mechanic materially increases the cost of vehicle maintenance.

An object of the present invention is to overcome disadvantages in prior pressure responsive mechanisms of the indicated character and to provide an improved pressure responsive mechanism which is particularly adatped for use in dual hydraulic brake systems of automotive vehicles wherein the front and rear brakes are actuated by independent hydraulic brake systems; which is actuable to effect a signal when a predetermined pressure differential occurs between the dual hydraulic brake systems and which is automatically reset when the pressure differential in such hydraulic systems is reduced below a predetermined minimum.

Another object of the invention is to provide an improved pressure responsive mechanism actuable to effect full pressurization of the rear brake hydraulic system of an automotive vehicle equipped with pressure proportioning means in the event of loss of pressurization in the front brake system.

Another object of the invention is to provide an improved pressure responsive mechanism which is actuable to effect a signal when a predetermined pressure differential occurs between the dual hydraulic brake systems of an automotive vehicle and simultaneously effect the full pressurization of one of such systems in the event of a predetermined reduction of pressure in the other of such systems.

Another object of the invention is to provide an improved pressure responsive mechanism incorporating improved means for closing a pair of electrical contacts when a predetermined pressure differential occurs in a dual hydraulic system of an automotive vehicle and opening such electrical contacts when the pressure differential is restored to a value below a predetermined minimum.

Another object of the invention is to provide an improved pressure responsive mechanism actuable to effect a signal when a predetermined pressure differential occurs between two hydraulic systems and simultaneously control the flow of fluid through one of such systems.

Another object of the invention is to provide an improved pressure responsive mechanism facilitating the detection of failures in dual hydraulic brake systems of automotive vehicles.

Still another object of the invention is to provide an improved pressure responsive mechanism that is economical and commercially feasible to manufacture, assemble and test with mass production labor and methods, durable efficient and reliable in operation.

The above as well as other objects and advantages of the present invention will become apparent from the following description, the appended claims and the accompanying drawings.

BRIEF DESCRIPTION OF THE DRAWINGS

FIG. 1 is a cross sectional view of a pressure responsive mechanism embodying the present invention, showing the same in association with schematically illustrated components of an automotive vehicle hydraulic brake system;

FIG. 2 is a graph illustrating the manner in which the pressure curves at the front and rear brake actuators of an automotive vehicle diverge as the result of pressure proportioning means operating in a dual hydraulic brake system;

DETAILED DESCRIPTION

Figure 1A:
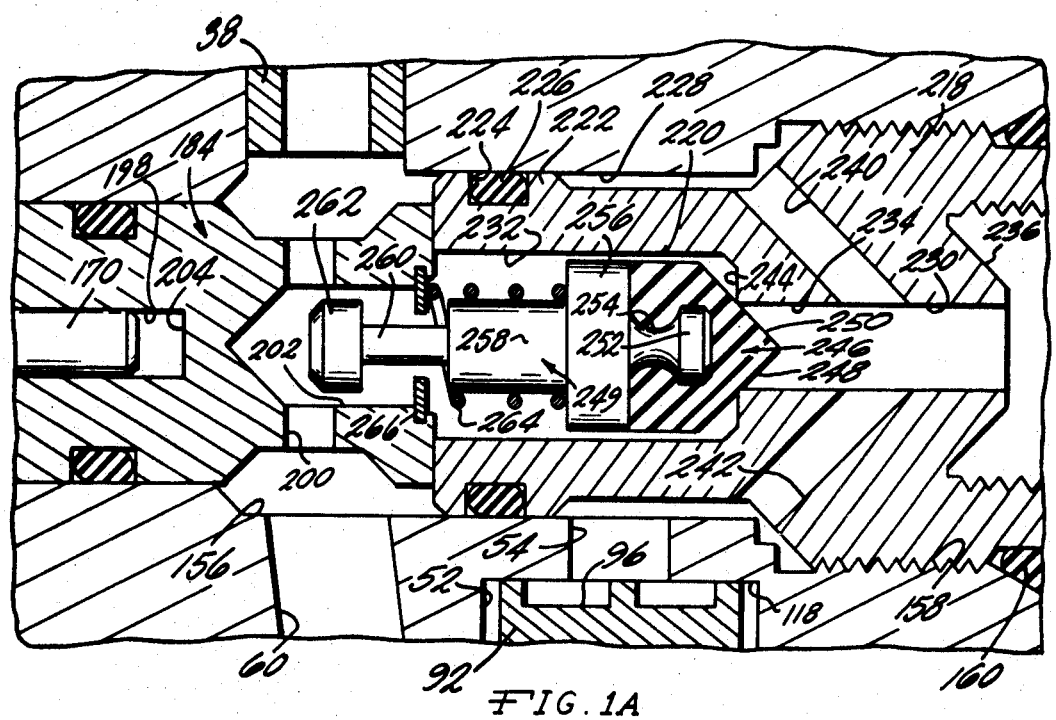
FIG. 1A is an enlarged view of a portion of the structure illustrated in FIG. 1.
Figure 3:
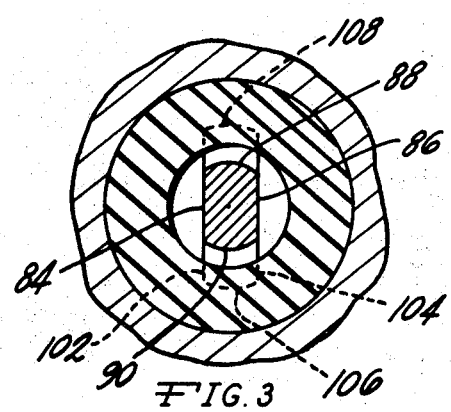
FIG. 3 is an enlarged cross-sectional view of a portion of the structure illustrated in FIG. 1, taken on line 3—3 thereof.
Figure 4:
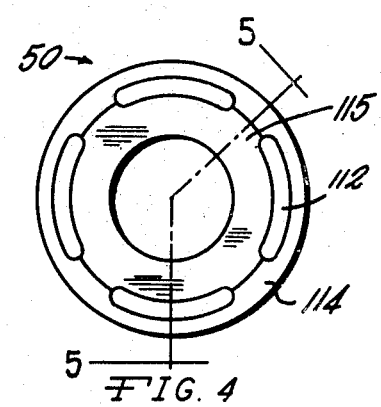
FIG. 4 is a top view of the annular valve embodied in the structure illustrated in FIG. 1, showing the same removed therefrom.
Figure 5:
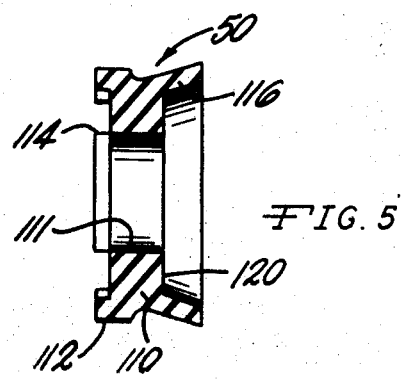
FIG. 5 is a cross-sectional view of the annular valve illustrated in FIG. 4, taken on the line 5—5 thereof.

Referring to the drawings, a pressure responsive mechanism, generally designated 10, is illustrated embodying the present invention, the pressure responsive mechanism 10 having particular utility in hydraulic brake systems of automotive vehicles of the type diagrammatically illustrated in FIG. 1, although it will be understood that the present invention is applicable to other uses. Hydraulic brake systems of the type illustrated in FIG. 1 are conventionally known as dual or split brake systems, and in such systems, hydraulic fluid is delivered from a dual master cylinder 12 actuated by a conventional brake pedal 14, a power booster (not shown) being interposed, if desired, between the brake pedal 14 and the dual master cylinder 12 to boost the manual effort applied by the driver of the vehicle. Hydraulic fluid is delivered from the outlet 15 of the dual master cylinder through a line 16 to the brake actuators or wheel cylinders 18 and 20 of the front wheels of the vehicle, and hydraulic fluid is also delivered from the outlet 22 of the dual master cylinder 12 to the brake actuators or wheel cylinders 24 and 26 provided at the rear wheels of the vehicle, the pressure responsive mechanism 10 being interposed between the dual master cylinder 12 and the brake actuators 19, 20, 24 and 26.

The dual master cylinder 12 and the brake actuators 18, 20, 24 and 26 are of conventional construction and operation and their use is so well known in the art that a detailed description thereof is not required for a full understanding of the present invention.

In the embodiments of the invention illustrated, the pressure responsive mechanism 10 incorporates a proportioning valve, generally designated 28, which may be of the type disclosed and claimed in the co-pending application of George R. Kish and Edward L. Volker, Ser. No. 874,483, filed Nov. 6, 1969 for "Proportioning Valve" and assigned to the assignee of the present invention. As shown in FIG. 1, the pressure responsive mechanism 10 is comprised of a body 30 and the proportioning valve 28 is incorporated in the body 30 as a part of the pressure responsive mechanism but it will be understood that the proportioning valve 28 may be embodied in a separate structure if desired. In the preferred embodiment of the invention illustrated, the body 30 defines a stepped bore 32 which communicates with an inlet port 34 connected by a line 36 to the outlet 22 of the dual master cylinder 12 as illustrated diagrammatically in FIG. 1, a flare fitting such as 38 being provided at the inlet port 34 of the body 30 to facilitate connection of the pressure responsive mechanism to the line 36. The body 30 of the pressure responsive mechanism also includes an outlet port 40 connected to the rear wheel brake actuators 24 and 26 by a line 42 having a suitable T-connection 43 to the rear wheel brake actuators 24 and 26, an internally flared fitting 44 which will be described hereinafter in greater detail being provided at the port 40 to facilitate connection of the line 42 to the body of the pressure responsive mechanism.

The proportioning valve assembly, generally designated 28, includes a pressure responsive member or piston 48 (which is preferably formed of metal or other suitable material having sufficient strength to withstand the forces exerted thereon) and an annular, resilient valve element 50 (which is preferably formed of rubber or other suitable resilient material, the pressure responsive member or piston 48 and the annular valve element 50 being disposed in the stepped bore 32 and being adapted to control communication between the inlet port 34 and the outlet port 40. The stepped bore 32 defined by the body 30 includes a reduced diameter portion 52 at the inner end thereof which communicates with the outlet port 40 through a passageway 54 defined by the body 30. The stepped bore 32 also includes an intermediate portion 56 which is larger in diameter than the portion 52 while the lower end portion 58 of the stepped bore 32 is larger in diameter than the portion 56 and communicates with the inlet port 34 through a passageway 60 defined by the body 30. The lower end portion 58 of the stepped bore is closed by a cap 62 which threadably engages the body 30, an O-ring 64 being interposed between the cap 62 and the body 30 to provide a fluid tight seal sealing the threaded connection between the cap 62 and the body 30. The central portion 66 of the cap defines an axially extending bore 68 adapted to receive the cylindrical stem portion 70 of the pressure responsive member 48 for reciprocating movement therein, a conventional quad-ring seal 72 being provided which is disposed in a groove 74 defined by the central portion 66 of the cap, the quadring seal 72 providing a double acting fluid tight dynamic seal between the stem portion 70 of the pressure responsive member and the cap. A boot 76 is secured to the end cap 62 by an integral flange 78, the boot surrounding the lower end portion 80 of the piston stem 70 and functioning to prevent the entrance of foreign material into the bore 68 defined by the central portion of the cap.

In addition to the cylindrical stem 70, the pressure responsive member 48 includes an integral intermediate portion 82 having opposed flat sides 84 and 86 joined by curvilinear surfaces 88 and 90 which are preferably formed as arcs of a circle, the intermediate portion 82 in turn being integral with a head portion 92, the upper end of which is of castellated form having angularly spaced projections 94 defining angularly spaced fluid passageways 96 therebetween. The head portion 92 also includes an annular axially extending lip portion 98 which is greater in diameter than the stem portion 70 and which projects downwardly as viewed in FIG. 1.

The pressure responsive member 48 also includes a radially extending flange portion 100 having flat sides 102 and 104 preferably disposed in the planes of the flat sides 84 and 86, respectively, of the intermediate portion 82 of the pressure responsive member and being joined by curvilinear surfaces 106 and 108 preferably formed as arcs of a circle concentric with but greater in diameter than the curvilinear surfaces 88 and 90 of the central portion 82, the radius of curvature of the curvilinear portions 106 and 108 being less than the radius of curvature of the cylindrical section 56 of the stepped bore 32.

The annular valve element 50 includes a body 110 defining a centrally disposed bore 111, the upper end of the body being of castellated form to define angularly spaced, upwardly extending projections 112 defining angularly spaced fluid passageways 114 therebetween around the periphery of the upper sealing surface 115 of the body 110. The annular valve element 50 also includes a skirt portion 116 which projects angularly outwardly and downwardly from the body portion, as viewed in FIG. 1, and engages the internal wall of the body defining the intermediate section 56 of the stepped bore 32, the annular valve 50 being disposed in the intermediate portion 56 of the stepped bore so that the upper ends of the projections 112 bear against the shoulder 118 provided on the body portion between the intermediate portion 56 and the reduced diameter portion 52 of the stepped bore. The lower surface 120 of the body portion of the annular valve bears against the upper surface 122 of the flange portion 100 of the pressure responsive member 48.

As shown in FIG. 1, the pressure responsive member 48 is biased upwardly by a coil spring 124 the lower end portion of which bears against the cap member 62 while the upper end portion of the spring 124 bears against a spring retainer 126, the spring retainer having an axially extending flange portion 128 the upper end of which bears against the lower surface 130 of the flange portion 100 of the pressure responsive member 48.

In the preferred embodiment of the invention illustrated, the body 30 also defines a stepped bore 132 the longitudinal axis of which extends in a direction substantially perpendicular to the longitudinal axis of the stepped bore 32. The left end portion 133 of the bore 132, as viewed in FIG. 1, communicates with a second inlet port 134 that is connected to the outlet 15 of the dual master cylinder 12 by the line 16, a suitable flare fitting 136 being provided at the inlet port 134 to facilitate connection of the line 16 to the body 30. The inlet port 134 and the left end portion 133 of the bore 132 also communicate with outlet passageways 138 and 140 connected to outlet ports 142 and 144 by an outlet passageway 146, the outlet port 142 being connected to the front wheel brake actuator 18 by a line 148 while the outlet port 144 is connected to the front wheel brake actuator 20 by a line 150. Suitable flare fittings 152 and 154 are provided at the outlet ports 142 and 144, respectively, to facilitate connection of the lines 148 and 150 to the body 30. With such a construction the hydraulic pressure of the fluid flowing through the line 16 is applied to the front wheel brake actuators 18 and 20, the fluid flowing from the inlet port 134 through the left end portion of the bore 132 to the outlet passageways 138, 140 and 146 and then to the outlet ports 142 and 144 and the lines 148 and 150, respectively, to the actuators 18 and 20.

The stepped bore 132 includes an intermediate portion 156 which is larger in diameter than the portion 133 of the stepped bore, the intermediate portion 156 merging with the enlarged right end portion of the stepped bore that defines the outlet port 40 previously described. The intermediate portion 156 of the bore 132 communicates with the inlet port 34 and with the passageway 60 leading to the chamber 58.

The right end or outlet portion 40 of the bore 132 is closed by the valve fitting 44 which threadably engages the body 30 as at 158, a suitable seal 160 being interposed between the body and an end flange 162 provided on the fitting 44 to provide a fluid tight seal between the fitting 44 and the body 30.

An elongate actuating member 164 is provided which is mounted for reciprocal movement in the reduced diameter portion 133 of the stepped bore 132. The actuating member 164 includes a central body portion 166 and a pair of reduced diameter end portions 168 and 170 which project axially outwardly from the opposite ends of the central portion 166. The central portion 166 defines a groove 172 providing ramp surfaces 174 and 176 which are adapted to engage a plunger 178 provided on an electrical switch mechanism, generally designated 180, which will be described hereinafter in greater detail. The ramp surfaces 174 and 176 are adapted to engage the adjacent rounded end of the plunger 178 selectively when the actuating member moves off center with respect to the plunger.

A pair of pistons 182 and 184 are provided which are disposed in the portion 133 of the stepped bore on opposite ends of the actuating member 164. In the embodiment of the invention illustrated the pistons 182 and 184 are identical in construction and made interchangeable for purposes of economy of manufacture but it will be understood by those skilled in the art that the pistons need not be identical. In the embodiment of the invention illustrated each of the pistons 182 and 184 includes a head portion 186, a reduced diameter neck portion 188 and a foot portion 190. The head portions 186 of each of the pistons define an annular groove 192 adapted to receive an O-ring seal 194 providing a fluid tight seal between the head portions of the pistons and the wall 196 of the body 30 defining the portion 133 of the stepped bore 132. The head portions 186 of each of the pistons 182 and 184 also define an axially extending blind bore 198 adapted to receive the reduced diameter end portions 168 and 170 of the actuating member 164. The neck portions 188 of each of the pistons 182 and 184 define a transversely extending passageway 200 and the neck and foot portions of each of the pistons also define an axially extending counterbore 202 as shown in FIG. 1.

As shown in FIG. 1, under normal conditions and with the brakes in the non-applied condition, the reduced diameter end portions 168 and 170 of the actuating member 164 project partially into the blind bores 198 of the pistons 182 and 184 so that the ends of the portions 168 and 170 of the actuating member are disposed in spaced relationship with respect to the end walls 204 of the blind bores 198. Since pistons 182 and 184 are spring biased and normally spaced from actuator portions 168 and 170, they will be moved each time the brakes are applied instead of only when a failure occurs. This is desirable because it prevents sticking at seals 194 due to non-use when a failure does occur.

A sleeve 210 is provided which encompasses the medial portion of the actuating member 164 including the groove 172, the sleeve 210 being provided with an opening 212 through which the end portion of the plunger 178 projects into the groove 172 provided in the actuating member. A pair of coil springs 214 and 216 are provided which spacedly surround the opposite end portions of the actuating member, one end of the spring 214 bearing against the head portion of the piston 182 while the opposite end of the spring 214 bears against the adjacent end of the sleeve 210. One end of the spring 216 bears against the head portion of the piston 184 while the opposite end of the spring 216 bears against the adjacent end of the sleeve 210.

The valve fitting 44 includes a head portion 218 which is disposed in the outlet port 40 defined by the body 30 and which threadably engages the body 30 at 158. The valve fitting 44 also includes a reduced diameter neck portion 220 and a base portion 222. The neck portion 220 and the base portion 222 are disposed in the intermediate portion 156 of the stepped bore 132 and the base portion 222 defines an annular groove 224 adapted to receive an O-ring seal 226 providing a fluid tight seal between the base portion and the wall 228 of the body defining the intermediate portion 156 of the stepped bore 132. An outlet passageway 230 extends through the fitting 44, the passageway 230 including a section 232 which communicates with the inlet port 34 through the counterbore 202 and the transverse passageway 200 of the piston 184. The inner end of the section 232 communicates with an intermediate, reduced diameter, axially extending section 234 of the outlet passageway 230, the section 234 terminating adjacent a conventional flared seat 236 disposed in an internally threaded section 238 of the outlet passageway 230, the flared seat 236 being adapted to seat against a conventional externally threaded flare fitting (not shown) provided on the line 42 in a conventional manner.

Angularly disposed passageways 240 and 242 are provided in the fitting 44, the outer ends of the passageways 240 and 242 communicating with the intermediate section 228 of the stepped bore 132 while the inner ends of the passageways 240 and 242 communicate with the section 234 of the outlet passageway 230. With such a construction the passageway 54 communicates with the line 42 through the angularly disposed passageways 240 and 242 and the intermediate section 234 of the outlet passageway 230.

The radially disposed surface 244 at the intersection of the sections 232 and 234 of the outlet passageway 230 provides a valve seat for a valve generally designated 246. The valve 246 includes a resilient valve element 248 having a tapered surface 250 adapted to engage the seat 244 to close communication between the sections 232 and 234 of the outlet passageway 230. The resilient valve element 248 is carried by a valve member 249 having a head 252 and a neck 254 embedded within the resilient element 248. The valve member 249 also includes a shoulder 256, a body 258, a reduced diameter leg portion 260 and a foot portion 262. The valve 246 is biased toward the closed position against the seat 244 by a coil spring 264 one end of which bears against the shoulder 256 while the opposite end of the coil spring 264 bears against a snap ring 266 which spacedly surrounds the leg portion 260 of the valve 246, the peripheral portions of the snap ring gripping the piston 184. With such a construction, movement of the piston 184 to the left, as veiwed in FIG. 1, causes the snap ring to engage the foot portion 262 of the valve so as to move the resilient valve element 248 off of the seat 244 so as to open communication through the outlet passageway 230 from the inlet port 34 to the line 42, the valve element 248 being held off of the seat as long as the piston 184 is displaced to the left a distance greater than the distance between the foot portion 262 of the valve and the snap ring 266.

In the embodiment of the invention illustrated the switch 180 includes a body 270 which threadably engages the body 30 as at 272, a seal 274 being disposed between the body 270 and the body 30 so as to provide a fluid tight seal therebetween. The body 270 carries an electrically insulated conductor 276 which is electrically connected to the vehicle battery 278 in circuit with a signaling device, such as a lamp 280, which is preferably disposed on the vehicle dashboard and which, when energized, functions to apprise the vehicle operator of a failure in the dual hydraulic brake system. The conductor 276 is also electrically connected to a contact 282 carried by an electrical insulator 284 disposed in a recess 286 defined by the body 270. The plunger 178 includes a flange portion 288 and an axially projecting contact portion 290 adapted to make and break with the contact 282, the contact portion 290 of the plunger being biased toward the open position by a spring 292 one end of which bears against the flange 288 of the plunger 178 while the opposite end of the spring 292 bears against the insulator 284. The plunger 178 passes through a sleeve 294 preferably formed of electrically conducting material such as brass. The lower end of the sleeve 294 projects into the opening 212 provided in the sleeve 210 so as to prevent relative perpendicular movement between the sleeve 210 and the sleeve 294 while the rounded lower end of the plunger 178, as viewed in FIG. 1, projects beyond the adjacent end of the sleeve 294 and into the groove 172 of the actuating member 164.

The body 30 is also formed of a metallic electrically conducting material and is electrically grounded as at 300 in a conventional manner so that when the contacts 282 and 290 are closed, an electrical circuit is completed from battery through the lamp 280, conductor 276, the contacts 282 and 290, the plunger 178, sleeve 294 and the body 30 to ground so as to energize the lamp 280.

In the operation of the pressure responsive mechanism 10, assuming an initial condition in which no manual force is being applied to the brake pedal 14, the components of the pressure responsive mechanism 10 will be disposed in the positions illustrated in FIG. 1. The graph of FIG. 2 will be referred to in conjunction with the operation of the proportioning valve 28 to indicate the relationship between the pressures at the outlets 15 and 22 of the master cylinder and the pressure at the outlet passageway 230 leading to the rear wheel brake actuators 24 and 26 of the vehicle. The origin or point O of FIG. 2 indicates the condition when no manual force is applied to the brake pedal 14, it being understood that in conventional practice the dual master cylinder 12 will have a residual pressure maintained by a residual check valve (not shown) when the proportioning valve is used on a vehical equipped with drum brakes at the rear wheels so that the rear wheel brake system of the vehicle is maintained under a slight pressure even though no manual force is applied to the brake pedal 14 thereby preventing the entrance of air into the rear brake system. For purposes of illustration however the residual brake pressure is indicated as zero at the origin of the graph of FIG. 2. When the vehicle is equiped with disc brakes at the rear wheels, a residual check valve is not conventionally utilized.

Upon application of manual force to the brake pedal 14, the pressure from the outlets 15 and 22 will follow the curve A indicated by the solid lines while the pressure from the outlet passageway 230 will follow the solid line (curve A) from the origin O to the point C and thereafter will follow the dashed curve B so that a fluid pressure differential is established between the front and rear brake actuators in the higher ranges of pressure applied by the master cylinder, the pressure differential being increased at a linear rate as the master cylinder pressure increases in the higher range. As increased manual force is applied to the brake pedal 14, the pressure from the outlets 15 and 22 will continue to follow the curve A indicated in solid line beyond the point C so that the pressure at the outlet 15 of the master cylinder is applied to the front wheel actuating cylinders 18 and 20 through the line 16 but the pressure from the outlet 22 of the master cylinder is modulated by the proportioning valve 28 and consequently the pressure applied to the rear wheel brake actuators 24 and 26 follows the dashed line B. With equal fluid pressures in the lines 16 and 36, communication to front wheel actuators 18 and 20 is effected in the manner previously described while communication to the rear wheel cylinders 24 and 26 is effected from the outlet 22 of the master cylinder through the line 36; the inlet port 34; the passageway 60; the portion 58 of the stepped bore 32; the passageway defined between the control portion 82 of the pressure responsive member 48 and the wall of the central bore 111 of the annular valve member 50; the reduced diameter portion 52 of the stepped bore 32; the passageways 96 and 54; and the passageways 240 and 242 to the outlet passageway 230 of the proportioning valve from which the fluid flows through the line 42 to the rear wheel actuating cylinders 24 and 26. At this stage of operation, the upper ends of the projections 94 on the head portion 92 of the pressure responsive member remain in engagement with the shoulder at the upper end of the stepped bore 32 due to the biasing action of the spring 124, and the rib 98 remains substantially in the position illustrated in FIG. 1 and out of contact with the upper sealing surface 115 of the annular valve 50. As the pressure increases in the stepped bore 32, the fluid pressure acting on the pressure responsive member 48, the effective area of which at this stage of operation is determined by the diameter of the stem portion 70, tends to move the pressure responsive member downwardly against the biasing action of the spring 124. The spring 124 is calibrated so that the rib 98 of the pressure responsive member does not engage the sealing surface 115 of the annular valve 50 until the desired pressure indicated by the point C on the curve A is reached. At such time, the rib 98 contacts the sealing surface 115 of the annular valve 50, thereby closing communication between the intermediate portion 56 of the stepped bore 32 and the reduced diameter portion 52 thereof through the bore 111 of the annular valve between the intermediate portion 100 of the pressure responsive member and the internal wall of the annular valve defining the bore 111. Thus the fluid path previously described from the inlet port 34 to the outlet passageway 230 remains open until the fluid pressure delivered from the outlet port 22 of the master cylinder to the stepped bore 32 reaches a predetermined value. When such value is reached, the annular lip 98 closes against the upper sealing surface 115 of the annular valve, the degree of pressure at which this occurs being dependent upon the force exerted by the spring 124 on the pressure responsive member as compared with the effective area of the pressure responsive member as determined by the cross-sectional diameter of the stem portion 70 of the pressure responsive member dynamically sealed in th bore 68. Thus during the lower ranges of applied master cylinder pressure, the pressure acting downwardly on the effective area of the pressure responsive member produces a downward force which is insufficient to overcome the force of the spring 124 exerted upwardly against the flange 100 of the pressure responsive member.

After the lip 98 closes against the upper sealing surface 115 of the annular valve, and the fluid pressure at the inlet port 34 is further increased by the master cylinder due to increased manual effort applied by the vehicle driver to the brake pedal 14, the increased fluid pressure will act agianst the pressure responsive member in a direction tending to unseat the annular rib 98 from the sealing surface 115 of the annular valve 50, the effective area of the pressure responsive member at this time being determined by the effective diameter of the annular rib 98 sealing against the surface 115 of the annular valve minus the area of the stem 70. The pressure acting against such effective area produces a force acting on the pressure responsive member tending to assist the spring 124 to unseat the annular rib 98 of the pressure responsive member from the sealing surface 115 of the annular valve 50 so that a portion of the increased pressure is delivered to the outlet passageway 230. Such increased fluid pressure, of course, tends to act downwardly upon the pressure responsive member 48 to produce a force, determined by the cross-sectional area of the stem portion 70, opposing the biasing action of the spring 124. This tends to reclose the annular lip 98 against the upper sealing surface 115 of the annular valve. The annular lip 98 of the pressure responsive member 48 thus opens and closes against the sealing surface 115 of the annular valve thereby modulating the pressure at the outlet passageway 230 so that the pressure at the outlet passageway 230 increases at a lower rate than the pressure applied by the master cylinder with the result that the pressure applied to the rear brake actuating cylinders 24 and 26 follows the dashed line curve B from the point C as the master cylinder pressure increases in the higher range. Accordingly, the fluid pressure existing at the front brake cylinders 18 and 20 will be greater than the fluid pressure at the rear brake actuating cylinders 24 and 26 when the brakes are applied with a force greater than that necessary to move the annular lip 98 of the pressure responsive member against the sealing surface 115 of the annular valve in opposition to the spring 124.

Upon a decrease in manual force applied to the brake pedal 14, the pressure in the sections 56 and 58 of the stepped bore tending to move the pressure responsive member upwardly is reduced because of the increased volume then provided in the master cylinder. When the decreasing pressure in the outlet side, acting on its appropriate effective area, can not support the load imposed by the spring 124, the lip portion 98 moves upwardly away from the sealing surface 115 and reopens the passageway through the bore 111 of the annular valve thereby relieving the pressure at the rear brake actuators 24 and 26 and equalizing the pressures on opposite sides of the annular valve 50. As the pressure at the inlet port 34 is further reduced due to the increase in volume in the master cylinder upon the lowering of the manual force applied thereto, the pressure responsive member 48 will be moved upwardly by the spring 124 to reopen the passageway through the bore 111 of the annular valve as previously described so that the pressure applied to the front and rear brakes is equalized and the components of the proportioning valve 28 return to the positions illustrated in FIG. 1.

As previously mentioned upon application of manual force to the brake pedal 14, the fluid pressure from the outlets 15 and 22 of the master cylinder 12 follows the curve A indicated by the solid line in FIG. 2 and such equal fluid pressures will be applied to the head portions 186 of the pistons 182 and 184 through the inlet ports 134 and 34, respectively. As equal fluid pressures are applied to the head portions of the pistons 182 and 184, the pistons 182 and 184 both move toward the actuating member 164 against the biasing action of the springs 214 and 216, respectively, until the ends of the reduced diameter portions 168 and 170 of the actuating member bottom on the end wall 204 of the blind bore 198 defined by each piston. Since the fluid pressures applied by the master cylinder to the inlet ports 134 and 34 are equal, and since the effective areas of the head portions of the pistons 182 and 184 are equal, the forces applied by the piston 182 to the actuating member 164 are counterbalanced by the forces applied to the actuating member by the piston 184 and the actuating member remains in the position illustrated in FIG. 1. The valve 246 also remains closed against the seat 244 since the distance between the end of the portion 170 of the actuating member and the end wall 204 of the blind bore 198 defined by the piston 184 is less than the distance between the foot portion 262 of the valve 246 and the snap ring 266, the snap ring 266 thus remaining out of contact with the foot portion 262.

Under such conditions the fluid pressure from the outlet 22 of the master cylinder applied to the rear brake actuators is controlled by the proportioning valve 28 in the manner previously described while the fluid pressure from the outlet 15 of the master cylinder is applied to the front brake actuators 18 and 20 in the manner previously described.

Assuming that a failure occurs in the rear wheel hydraulic system, as for example because of a break or rupture in the line 36, resulting in a loss or reduction of pressure at the inlet port 34, upon application of manual force to the brake pedal 14, the pressure at the inlet port 134 will be substantially greater than the pressure at the inlet port 34 with the result that fluid pressure applied to the head of the piston 182 will be substantially greater than the fluid pressure applied to the head of the piston 184. Under such conditions, the force exerted by the piston 182 is greater than the force exerted by the piston 184 and when the piston 182 engages the adjacent end of the reduced diameter portion 168 of the actuating member 164, the piston 182 will overcome any force exerted by the piston 184 and move the actuating member 164 to the right, as viewed in FIG. 1. When the actuating member 164 moves to the right, the ramp or cam surface 174 engages the adjacent rounded end of the plunger 178 and moves the plunger 178 upwardly as viewed in FIG. 1 and onto the peripheral surface of the central portion 166 of the actuating member against the biasing action of the spring 292. The contact portion 290 of the plunger 178 closes against the contact 282 when the plunger 178 moves upwardly on the ramp surface 174 to complete the electrical circuit through the lamp 280 in the manner previously described. When manual force is released from the pedal 14, the piston 182 will move back to the position illustrated in FIG. 1 due to the reduction in fluid pressure at the inlet port 134 and the force applied to the piston 182 by the spring 214. However the actuating member 164 and the plunger 178 will remain displaced and the contacts 282 and 290 will remain in the closed condition. Consequently the lamp 280 will remain energized as long as the failure in the rear brake system exists.

It will be understood, of course, that the front hydraulic system will continue to function when manual force is applied to the brake pedal 14 since the front and rear brake systems are hydraulically independent.

Assuming that the previously described failure of the rear brake system is then repaired, when manual force is applied to the brake pedal 14 after such repair, equal fluid pressures will be applied to the head portions of the pistons 182 and 184. However, since the actuating member 164 was displaced toward the piston 184 when the hydraulic failure occurred, the piston 184 will engage the end of the reduced diameter portion 170 of the actuating member before the piston 182 engages the end of the reduced diameter portion 168 of the actuating member and the actuating member will be moved by the piston 184 to the left, as viewed in FIG. 1, thereby enabling the plunger 178 to move back into the groove 172 due to the biasing action of the spring 292 thus opening the contacts 282 and 290 to open the circuit through the lamp 280 and extinguish the lamp.

Assuming now that a hydraulic failure occurs in the front wheel hydraulic system, as for example because of a break or rupture in the line 16 resulting in a loss or reduction of fluid pressure at the inlet port 134, upon application of manual force to the brake pedal 14, the pressure at the inlet 34 will be substantially greater than the pressure at the inlet port 134 with the result that the fluid pressure applied to the head of the piston 182 will be substantially less than the fluid pressure applied to the head of the piston 184. Under such conditions, when the piston 184 engages the adjacent end of the reduced diameter portion 170 of the actuating member 164, the piston 184 will overcome the force exerted by the piston 182 and move the actuating member 164 to the left, as viewed in FIG. 1. When the actuating member 164 moves to the left, the ramp or cam surface 176 engages the adjacent rounded end of the plunger 178 and moves the plunger 178 upwardly onto the peripheral surface of the central portion 166 of the actuating member against the biasing action of the spring 292 so that the contact portion 290 closes against the contact 282 to complete the electrical circuit through the lamp 280 in the manner previously described. When the manual force is released from the pedal 14, the piston 184 will move back to the right to the position illustrated in FIG. 1 due to the force applied by the spring 216 but the actuating member will remain displaced to the left and the plunger 178 will remain displaced upwardly so that the contacts 282 and 290 remain in the closed condition. The lamp 280 thus remains energized as long as the failure in the front brake system exists.

When a failure in the front brake system exists, it is desirable to bypass the proportioning valve means 28 so that the maximum available hydraulic pressure is applied to the rear wheel brake actuators 24 and 26 at all times and even in the higher ranges of pressure applied by the master cylinder. When a failure in the front brake system exists, the movement of the piston 184 to the left to displace the actuating member 164 to the left, as viewed in FIG. 1, causes the snap ring 266 to engage the foot portion 262 of the valve 246. As the piston 184 continues to move the left, the valve 246 is unseated from the seat 244 thereby opening the entire outlet passageway 230 so that the fluid pressure at the inlet port 34 is applied through the outlet passageway 230 to the line 42 thereby bypassing the proportioning valve means 28.

When manual force is released from the brake pedal 14, the piston 184 moves back to the right due to the biasing action of the spring 216. At the same time the valve 246 closes against the seat 244 due to the biasing action of the spring 264.

Assuming that the previously described failure in the front hydraulic system is then repaired, when manual force is applied to the brake pedal 14 after repair of the front system, equal fluid pressures will be applied to the head portions of the pistons 182 and 184. However since the actuating member 164 was displaced toward the piston 182 when the hydraulic failure occurred in the front brake system, the piston 182 will engage the end of the reduced diameter portion 168 of the actuating member before the piston 184 engages the end of the reduced diameter portion 170 of the actuating member with the result that the actuating member will be moved to the right, as viewed in FIG. 1, thereby enabling the plunger 178 to move back into the groove 172 thus opening the contacts 282 and 290 to open the circuit through the lamp 280 and extinguish the lamp.

Important advantages of the above described construction reside in the fact that the pressure responsive mechanism is actuatable whenever a loss of pressure occurs in either the front or the rear hydraulic brake systems to effect a signal apprising the vehicle operator of such failure and that the pressure responsive mechanism is automatically reset upon the first application of fluid pressure thereto after the failed portion of the system has been repaired. Moreover the pressure responsive mechanism is actuatable to disable brake proportioning means in the event of loss of pressure in the front brake system while pressurization of the rear brake system relative to the front brake system has been reduced by the brake proportioning means thereby restoring full pressurization of the rear brake system.

While a preferred embodiment of the invention has been illustrated and described, it will be understood that various changes and modifications may be made without departing from the spirit of the invention.

What is Claimed is:

1. In a pressure responsive mechanism, the combination including a body defining a bore, said body having a pair of spaced fluid inlet passageways and a pair of fluid outlet passageways each communicating with said bore, an actuating member mounted for longitudinal movement in said bore intermediate said fluid inlet passageways, a pair of pressure responsive members disposed in said bore at opposite ends of said actuating member, each of said pressure responsive members having an abutment surface thereon normally spaced from and movable into engagement with the adjacent end portion of said actuating member upon an increase in pressure in the adjacent one of said pair of inlet passageways, said actuating member being movable from a first to a second position by one of said pressure responsive members in response to a differential in pressure in said inlet passageways, said actuating member being movable by the other of said pressure responsive members from said second position to said first position in response to equal positive pressures in said inlet passageways, valve means carried by said body intermediate one of said inlet passageways and one of said outlet passageways and controlling the flow of fluid between said one inlet passageway and said one outlet passageway, a valve seat in said body, means biasing said valve means toward said valve seat, and means operable in response to movement of said actuating member from a first to a second position for moving said valve means away from said seat and operable in response to movement of said actuating member from said second position to said first position to effect movement of said valve means toward said seat.

2. The combination as set forth in claim 1 including resilient means biasing said abutment surface on each of said pressure responsive members away from said adjacent end portion of said actuating member.

3. The combination as set forth in claim 1 including electrical switch means carried by said body, and means actuatable in response to movement of said actuating member for opening and closing said switch means.

4. The combination as set forth in claim 1 wherein each of said pressure responsive members is in the form of a piston mounted for reciprocal movement in said bore.

5. A pressure responsive mechanism for use in hydraulic brake systems of automotive vehicles and adapted to be interposed between a master cylinder and wheel brake actuators of the vehicle, said pressure responsive member including a body defining a bore, said body having a pair of fluid inlet passageways and a pair of fluid outlet passageways each communicating with said bore, said inlet passageways being adapted to be connected to said master cylinder, said outlet passageways being adapted to be connected to said wheel brake actuators, an actuating member mounted for longitudinal movement in said bore intermediate said inlet passageways, a pair of pressure responsive members disposed in said bore at opposite ends of said actuating member, each of said pressure responsive members having an abutment surface thereon normally spaced from and movable into engagement with the adjacent end portion of said actuating member upon an increase in pressure in the adjacent one of said pair of inlet passageways, said actuating member being movable from a first to a second position by one of said pressure responsive members in response to a differential in pressure in said inlet passageways, said actuating member being movable by the other of said pressure responsive members from said second position to said first position in response to equal positive pressures in said inlet passageways, resilient means biasing each of said abutment surfaces on said pressure responsive members away from said adjacent end portion of said actuating member, electrical switch means carried by said body, means operable in response to movement of said actuating member for opening and closing said switch means, a valve member carried by said body intermediate one of said inlet passageways and one of said outlet passageways, and means including lost motion means connecting said valve member to one of said pressure responsive members and operable upon movement of said actuating member from a first position to a second position for opening said valve member and operable in response to movement of said actuating member from said second position to said first position to close said valve member.

6. The combination as set forth in claim 5 wherein each of said pressure responsive members is in the form of a piston mounted for reciprocal movement in said bore.

7. The combination as set forth in claim 5 including a sleeve disposed in said bore and encompassing a portion of said actuating member, means maintaining said sleeve in a fixed position relative to said body, said resilient means bearing against said sleeve and each of said pressure responsive members.

8. The combination as set forth in claim 5, said actuating member having a pair of spaced cam surfaces thereon adapted to bear against said means for opening and closing said switch means.

9. The combination as set forth in claim 5, said means for opening and closing said switch means including a plunger projecting into said bore, said actuating member defining a groove adapted to receive said plunger, and resilient means biasing said plunger towards said actuating member.

10. The combination as set forth in claim 9 including resilient means biasing said valve toward the closed position.

* * * * *